April 2, 1935. F. O. ALBERTSON ET AL 1,996,092
VALVE SEAT GAUGE
Filed Dec. 22, 1932 2 Sheets-Sheet 1
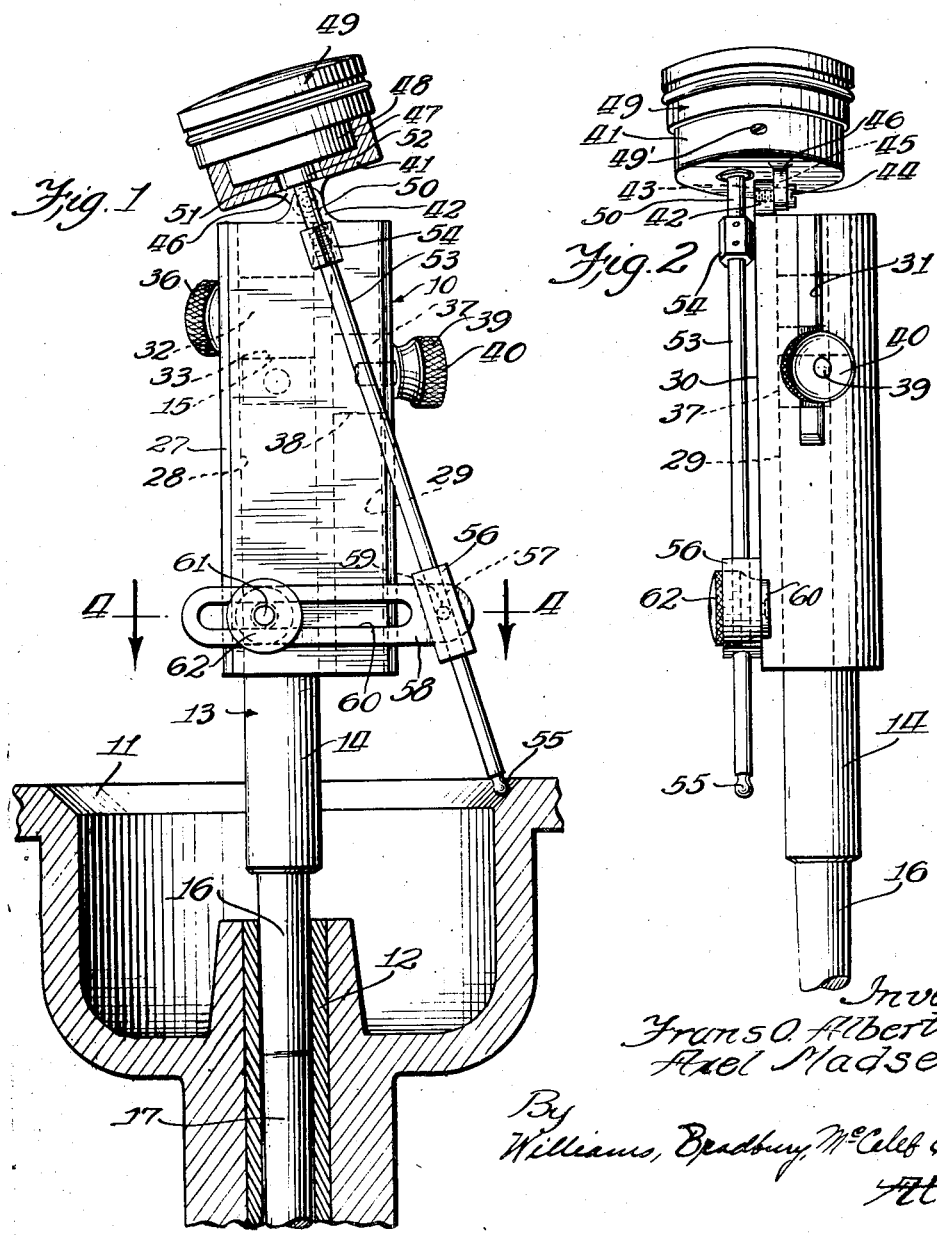
Inventors
Frans O. Albertson
Axel Madsen
By Williams, Bradbury, McCaleb & Hinkle
Attys April 2, 1935.  F. O. ALBERTSON ET AL  1,996,092
VALVE SEAT GAUGE
Filed Dec. 22, 1932    2 Sheets-Sheet 2
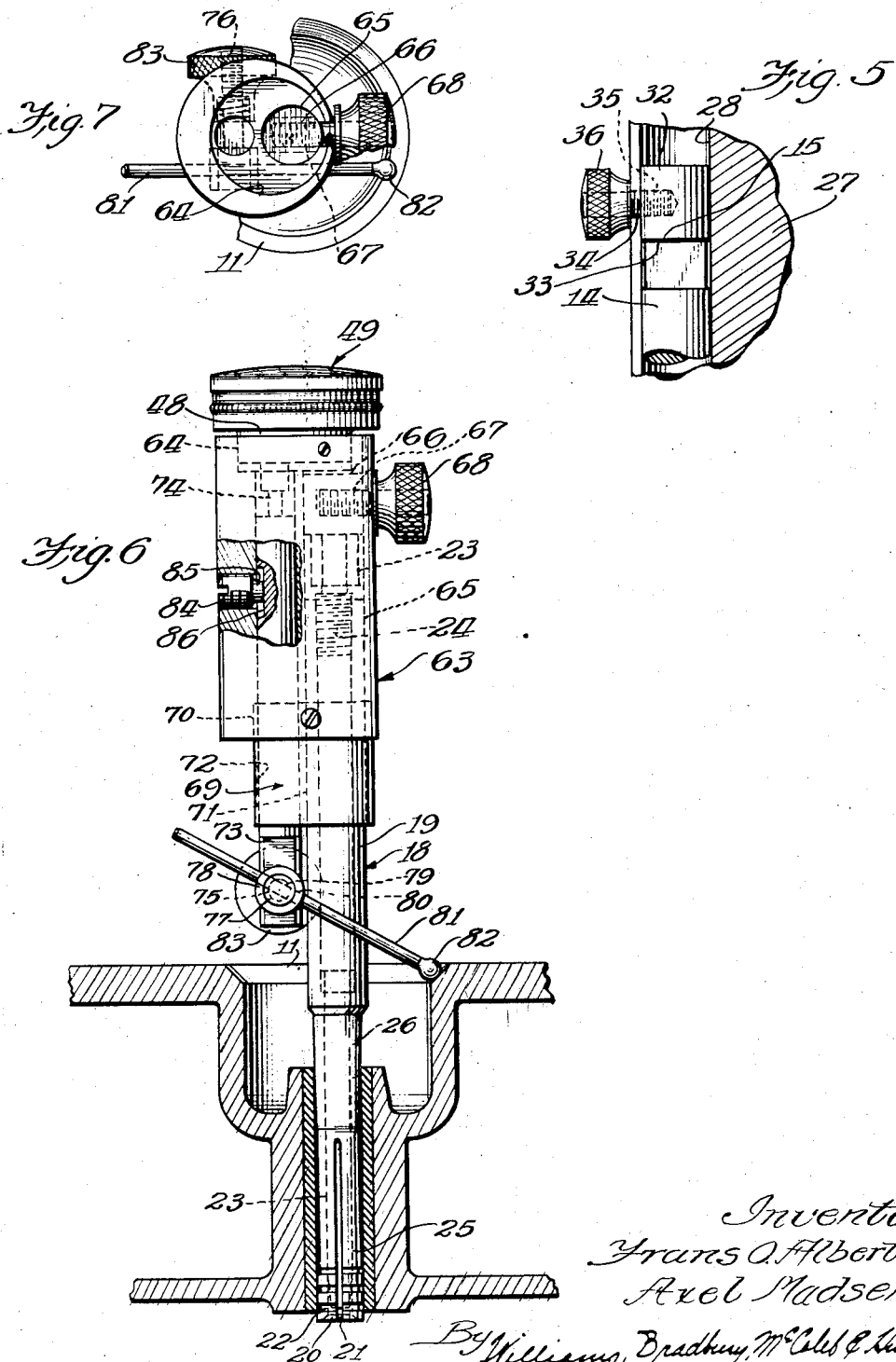

Patented Apr. 2, 1935

1,996,092

UNITED STATES PATENT OFFICE 1,996,092

VALVE SEAT GAUGE

Frans O. Albertson and Axel Madsen, Sioux City, Iowa, assignors to Albertson & Company, Inc., Sioux City, Iowa, a corporation of Iowa Application December 22, 1932, Serial No. 648,350

10 Claims. (Cl. 33—172)

The present invention relates to valve seat gauges, and is particularly concerned with gauges for indicating the condition of a valve seat with respect to the valve guide or the uniformity of elevation of a valve seat at a predetermined distance from the axis of a valve stem guide or the lack of these qualities.

One of the objects of the present invention is the provision of an improved commercial form of the valve seat gauges of the type disclosed in our prior applications, Ser. No. 487,134, filed October 8, 1930, which resulted in Patent No. 1,891,364, issued December 20, 1932, and Ser. No. 600,106, filed March 21, 1932, which resulted in Patent No. 1,891,365, issued December 20, 1932, both entitled Valve seat gauges.

Another object of the invention is the provision of an improved valve seat gauge of the class described which is simpler in construction, more accurate than the valve seat gauges of the prior art, and capable of more economical manufacture, so that the gauge may be placed within the means of a large number of users.

Certain of the valve seat gauges of the prior art have been provided with dial indicators, the dial indicator having a feeler or plunger which engages the upper end of a gauge body or finger carrier, or the upper end of a pilot stem, the gauge body or finger carrier being rotatably and reciprocably mounted on the pilot stem, with the dial indicator either mounted on the gauge body, finger carrier, or on the pilot stem.

In such case, the gauge body or finger carrier usually carries an adjustable finger or wiping arm which slides over the surface of the valve seat as the gauge body or finger carrier is rotated on the pilot stem, and the accuracy of a gauge of that type depends upon the accuracy of the intermediate connecting mechanism. For instance, where the gauge body slides under the plunger or feeler of the dial indicator, the accuracy of the indication is dependent upon having the upper end of the finger carrier or gauge body exactly plane and at right angles to the axis of the valve stem guide and pilot stem. If this surface is not accurately at right angles or has any depressions or irregularities into which the plunger or feeler of the dial indicator may move, then the dial indicator will indicate the irregularities of surface of the end of the finger carrier or gauge body and appear to show irregularities in the surface of the valve.

Under other conditions, the irregularities or lack of concentricity of a valve seat surface may not be properly indicated on the dial indicator on account of the compensation which results from the irregularities in the surface of the finger carrier with which the plunger of the dial indicator engages.

In other types, where the plunger of the dial indicator engages the end of the pilot stem, such valve seat gauges cannot be used with expanding pilots of the type having an expanding screw at the top because the surface of the screw would not be accurately plane nor at right angles to the axis of the pilot stem, and where even a solid pilot stem is used inaccuracies may result in indication on account of the variations in the surface of the end of the pilot stem.

One of the objects of the present invention is the provision of an improved valve seat gauge in which the reciprocating movement of the supporting gauge body is eliminated and in which the gauge body is not utilized as one of the elements of the interconnecting mechanism between the member engaging the valve seat and the dial indicator, thereby increasing the accuracy of the device by eliminating uncertain factors.

Another object of the invention is the provision of an improved valve seat gauge employing a dial indicator and a feeler in which the feeler of the dial indicator is brought into direct engagement with the valve seat gauge, the dial indicator being suitably mounted for wiping across the surface of a valve seat according to a predetermined principle so that irregularities in the seat will be indicated upon the dial indicator.

Another object of the invention is the provision of an improved dial indicator of the class described, which may be utilized for relatively small valves and also for relatively large valves and the provision of a valve seat gauge of the class described which is elongated and relatively narrow in structure so that it may be used for engaging the surface of a valve seat where there is not much room between the valve seat and adjacent parts.

Another object of the invention is the provision of an improved valve seat gauge of the class described which may be utilized with several different types of pilots of different sizes, structure, and characteristics, such as tapered pilots, expanding pilots, and tapered expanding pilots, with a high degree of accuracy.

Other objects and advantages will be apparent from the following description and from the accompanying drawings, in which similar characters of reference indicate similar parts throughout the several views.

Referring to the drawings, of which there are two sheets:

Fig. 1 is a side elevational view of a valve seat gauge constructed according to the present invention and shown with the valve and valve stem guide in section;

Fig. 2 is a side elevational view taken from the right of Fig. 1;

Fig. 3 is a top plan view of the gauge with the dial unit removed;

Fig. 4 is a sectional view taken on the plane of the line 4—4 of Fig. 1;

Fig. 5 is a sectional view taken on the plane on the line 5—5 of Fig. 3;

Fig. 6 is a side elevational view similar to Fig. 1 of a modification; and

Fig. 7 is a top plan view of the modification of Fig. 6 with the dial indicator removed.

Referring to Figs. 1 to 5, the present valve seat gauge, indicated in its entirety by the numeral 10, is shown in connection with a relatively large valve seat 11 arranged concentrically with respect to a valve stem guide 12. The present valve seat gauges may be used with any of the various types of valve stem pilots, such as, for example, the expanding pilot shown in our prior patent, No. 1,806,189, issued August 19, 1931, the tapered-cylindrical pilot shown in our prior application Serial No. 538,504, filed May 19, 1931, 1,902,207, issued March 21, 1933, or the new tapered, expanding pilots of the type shown in Fig. 6.

The embodiment shown in Fig. 1 is illustrated in connection with a tapered-cylindrical pilot 13 having a substantially cylindrical upper part 14, having an upper flat end 15. This type of pilot is provided with a very gradually tapered portion 16 which extends over approximately one-third of the length of the valve stem guide 12, and with a lower accurately formed cylindrical portion 17, which fits the valve stem guide 12 very closely, preferably within one thousandth of an inch tolerance. The valve stem pilots are provided in various sizes, differing only by thousandths of an inch from each other to accomplish this fit.

The gradually tapered portion 16 is tapered so gradually that it cannot be discerned with the naked eye, and the taper is sufficient so that the pilot is held in place in the valve stem guide solely by the wedging of the tapered portion in the upper bell shaped part of the valve stem guide, while the pilot is accurately centered by means of the lower and accurately cylindrical part of the pilot 17 which fits in the cylindrical middle portion of the valve stem guide.

The taper is preferably about twenty-two thousandths of an inch per foot; that is, the diameter of the pilot decreases twenty-two thousandths of an inch for each foot of its length, and the taper is preferably within the range of from fifteen to thirty thousandths per inch taper per foot of length. This taper is so gradual that the pilot may be forced down into the fixed position by means of the pressure on the top of the pilot.

Another form of pilot which may be used is the tapered-expanding pilot of the type shown in Fig. 6. This pilot 18 is provided with an upper cylindrical portion 19 and with a lower split end 20 having axially extending slots 21 and preferably provided with circumferential grooves 22. An expanding member 23 is threaded into the threaded upper end of a bore 24 and has its lower end in wedging engagement with the tapered bore between the split ends 20 of the pilot 18 and is thus adapted to expand the lower end of the pilot.

The lower end 25 of the pilot 18 is preferably cylindrical in form, and this cylindrical portion is about two-thirds the length of the customary valve stem guides. The pilot is also preferably provided with a very gradually tapered portion 26, the taper of which is within the limits previously described for the tapered pilot 13 and adapted to secure the pilot in place by means of the wedging action of the pilot.

It should be noted that the tapered portion 26 has a much more gradual taper than that which is shown in our prior patent on the expanding pilot referred to above.

Referring again to Fig. 1, any types of the pilots may be utilized in any of the modifications. The valve seat gauge preferably comprises a metal body 27 which may be of substantially cylindrical shape and which is preferably provided with a pair of axially extending bores 28, 29 located side by side and toward one side of the cylindrical body, as shown in Fig. 3.

The cylindrical body 27 may be provided with a flat side 30, and the flat surface 30 should come as close as possible to the bores 28 and 29 while still leaving sufficient metal to secure the parts together so that the indicator plunger may be used upon relatively small valves close to the pilot.

The bore 28 is of a large size adapted to fit pilots having a cylindrical portion 14 which is larger than the cylindrical portion 19 of the pilot in Fig. 6.

The bore 29 is of smaller size adapted to fit the other type of pilots having a relatively small upper cylindrical portion. It should be understood that various types of pilots are provided with valve seat tools for different purposes, and the purpose of the two bores 28 and 29 is to adapt the valve seat gauge for use with pilots of various sizes manufactured by the applicants' assignee.

The metal body 27 is preferably provided with an axially extending slot 30' communicating with the bore 28 and extending to the outside of the body, and with an axially extending slot 31 communicating with the bore 29 and extending to the outside of the gauge body. A cylindrical metal stop member 32, formed like a piston, is slidably mounted in the bore 28 and provided with a lower flat surface 33 for engaging the upper end of the pilot 13. The surface 33 is accurately plane and is ground to a hardened finished surface, and it is located exactly at right angles to the axis of the cylindrical stop member 32. The cylindrical stop member 32 is provided with a laterally projecting threaded stud 34 which is threaded home in a threaded bore 35 and projects outward through the slot 30'.

A knurled thumb nut 36 is threaded on the end of the stud 34 and is adapted to clamp the stop member 32 in any of a plurality of positions longitudinally of the bore 28. In a similar manner the smaller cylindrical stop member 37 is provided with a lower flat surface 38 and with a threaded stud 39 engaged by knurled nut 40. The stop members 32 and 37 may be inserted in their bores from the upper ends of the slots 30' and 31, as it will be apparent from Fig. 2 that the slots 30', 31 extend out of the upper end of the metal body 27. When the gauge is assembled, however, the stop members 32, 37 cannot fall out of their bores on account of the presence of the angularly adjustable dial indicator head 41, which is disposed in the path of the stop members 32, 37.

At its upper end the flat side 30 of the metal body 27 is provided with an upwardly projecting lug 42 having a threaded bore 43 for receiving a screw bolt 44. The screw bolt 44 has an enlarged cylindrical portion 45, thus forming an annular shoulder against which the screw bolt 44 may be threaded home in the bore 43, and the bolt 44 serves as a pivotal support for the dial indicator head 41. The dial indicator head 41 may consist of a metal member having a downwardly extending metal lug 46 adapted to be pivotally mounted on the cylindrical portion 45 of bolt 44. The dial indicator head 41 is provided with a substantially cylindrical socket 47 adapted to receive the lower cylindrical portion 48 of a dial indicator 49 which may be secured in place by a plurality of set screws 49' threaded through the wall of the metal head 41 into engagement with the dial indicator body.

The dial indicator 49 may consist of any of the dial indicators which may be purchased upon the open market, preferably provided with a dial and a pointer, the pointer being actuated by means of a downwardly projecting plunger 50 to which the pointer is connected by movement multiplying mechanism. For example, the dial indicator may be identical in construction with the dial indicator shown in our prior Patent No. 1,891,364, issued December 20, 1932, on our application Serial No. 487,134, filed October 8, 1930, for Valve seat gauges. The dial indicator head is provided with a bore 51 for passing the plunger 50 and the projecting part 52 of the dial indicator 49 therethrough, and the lug 46 on the head 41 is so located that the plunger 50 will be substantially parallel to the flat surface 30 on the gauge body and quite close to the pilot bores 28, 29.

In some embodiments of the invention, the plunger 50 may consist of an elongated integral member which forms the ordinary feeler of the dial indicator 49, but if the feeler or plunger 50 is not of sufficient length, it may be provided with an extension 53 secured to the upper part of the plunger 50 by a right hand, left hand threaded sleeve 54. The sleeve 54 may be further secured in place by transverse pins passing through the sleeve and through the rods 50, 53. The feeler rod 53 consists of an elongated metal member preferably constructed of hardened steel or some other durable metal and having a ball shaped formation 55 at its lower end for engaging the valve seat 11.

The feeler 53 is preferably guided at its lower end by an elongated metal member or guide block 56 comprising a block of metal having a cylindrical bore 57 slidably engaging the feeler rod 53.

The guide block 56 is pivotally mounted on an adjustable arm 58 by means of a pivot lug 59, and the adjustable arm 58 may consist of a strip of sheet metal formed with an elongated slot 60 extending longitudinally of the strip.

The valve gauge body 27 is provided with a laterally projecting threaded stud 61 which is fixedly secured in the flat side of the body and preferably adjacent the bore 28, and the stud 61 passes through the slot 60. The arm 58 may be secured in any of a plurality of adjusted positions by the clamping action of a knurled thumb nut 62 which is threaded on stud 61.

Referring to Figs. 6 and 7, this is a modification in which the gauge body 63 is formed with a socket 64 at its upper end for receiving the lower cylindrical portion 48 of the dial indicator 49. This device is also provided with a bore 65 in which is slidably mounted an adjustable stop 66 having a stud 67 and a securing nut 68.

The bore 65 is of sufficient size to receive either of the types of pilots intended to be used, and the pilot is guided by a lower guide member comprising a cylindrical metal member 69, which is secured in a counterbore 70 located in the end of the metal body 63. Several of the guide members 69, provided with different size bores for different pilots, may be used with the gauge so as to adapt the gauge for use on pilots of different size.

Guide member 69 is provided with a bore 71 for slidably engaging the cylindrical upper portion of the pilot and with a bore 72 for slidably engaging a plunger extension rod 73, the upper end of which engages the feeler or plunger 74 of the dial indicator 49.

Extension rod 73 is provided with a lower flattened end having a transverse bore 75 for receiving a screw bolt 76 provided with a cylindrical head 77 carrying a sleeve 78. Head 77 and sleeve 78 are provided with registering bores 79, 80 for slidably receiving the elongated cylindrical wiping rod 81.

The rod 81 is preferably constructed of hardened metal such as steel and is provided with a ball shaped formation 82 for engaging the valve seat. When the knurled thumb end 83 is threaded home on the bolt 76, the wiping arm 81 is clamped between the sleeve 78 and head 77 and adjustably secured to the extension rod 73 at a predetermined angle and with a predetermined length.

The wiping arm 81 should preferably be arranged substantially normal to the valve seat surface, and the length will depend upon the diameter of the particular valve seat in question.

The operation of the present valve seat gauge is substantially as follows:

Referring to Figs. 1 and 2, a pilot is fixedly secured in the valve stem guide 12. The valve body 27 is rotatably mounted on the upper end of the pilot 13, and the plunger or feeler 53 of the dial indicator 49 is moved to such an angular position that the ball 55 engages the valve seat 11. The adjustable arm 58 is then secured by means of thumb nut 62, and the guide 56 takes the angular position of the rod 53 and holds the rod in position to engage the valve seat. If the gauge body were then allowed to rest on the ball 55, the plunger 50 would be forced into the dial indicator to the upper limit of its stroke, but the body 27 is lifted sufficiently so that the pointer points at zero or any other desired numeral on the dial and so that the plunger is not at either limit of its movement but midway between the limits of its range of movement.

The stop member 32 is then moved longitudinally in the bore 28 until it engages the end 15 of pilot 13 and supports the body 27 on the pilot stem 13 for rotation. Stop member 32 is secured in this position by nut 36 and stud bolt 30'.

When the gauge body is then rotated with the plunger 53 in direct engagement with the valve seat, the irregularities in the valve seat will cause the plunger 53 to rise or fall and will produce corresponding indications by means of the pointer of the dial indicator. The movements of the plunger 53 are transmitted to the pointer of the dial indicator by the movement multiplying mechanism of the dial indicator unit, and the gauge may be used to indicate the regularity of elevation of the valve seat at any predetermined radius.

The operation of the device of Figs. 6 and 7 is substantially the same except that the adjustable wiping arm 81 has its length adjusted at its support, without changing the angular position of the dial indicator itself. The member 84 consists of a stop screw having its inner end 85 engaging in a slot 86 in the extension rod 73 to prevent the extension rod from falling out of the gauge.

Both of the types of gauges bring the dial indicator plunger or its extension in direct engagement with the valve seat, and they eliminate the use of intermediate finger carriers which introduce a factor of inaccuracy, depending upon the accuracy of the plane surface at the end of the finger carrier upon which the plunger engaged in the devices of the prior art.

The present devices are also most simple and capable of manufacture more cheaply so that they can be sold at a lower figure and brought within the means of a vast number of purchasers.

While we have illustrated two preferred embodiments of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. A valve seat gauge comprising a dial indicator having a plunger, a substantially cylindrical body, said cylindrical body being provided with means for pivotally mounting the dial indicator at its upper end with the indicator plunger carried by said indicator and extending substantially longitudinally of said gauge body for direct engagement with a valve seat adjacent the lower end of said body, and said body having a substantially flat side adjacent said plunger, whereby said plunger may be located adjacent the pilot for measurement of relatively small valve seats.

2. A valve seat gauge comprising a dial indicator having a plunger, a substantially cylindrical body, said cylindrical body being provided with means for pivotally mounting the dial indicator at its upper end with the indicator plunger carried by said indicator and extending substantially longitudinally of said gauge body for direct engagement with a valve seat adjacent the lower end of said body, said body having a substantially flat side adjacent said plunger, whereby said plunger may be located adjacent the pilot for measurement of relatively small valve seats, and adjustable stop members mounted in each of said bores for engaging the end of the pilot stem.

3. A valve seat gauge comprising a dial indicator having a plunger, a substantially cylindrical body, said cylindrical body being provided with means for pivotally mounting the dial indicator at its upper end with the indicator plunger carried by said indicator and extending substantially longitudinally of said gauge body for direct engagement with a valve seat adjacent the lower end of said body, an adjustable guide carried by the gauge slidably engaging the dial indicator plunger adjacent its lower end, and means for securing said guide in any of a plurality of positions radially with respect to the axis of said body.

4. A valve seat gauge comprising a dial indicator having a plunger, a substantially cylindrical body, said cylindrical body being provided with means for pivotally mounting the dial indicator at its upper end with the indicator plunger carried by said indicator and extending substantially longitudinally of said gauge body for direct engagement with a valve seat adjacent the lower end of said body, an adjustable guide carried by the gauge slidably engaging the dial indicator plunger adjacent its lower end, means for securing said guide in any of a plurality of positions radially with respect to the axis of said body comprising a stud carried by said body, a clamping member carried by the stud, and an arm adjustably mounted on said stud and carrying said guide.

5. In a valve seat gauge the combination of a pilot stem adapted to be fixedly secured in a valve stem guide with a gauge body rotatably and slidably mounted on said pilot stem, means for preventing downward sliding movement of said body on said stem, a dial indicator pivotally mounted on said gauge body and having a downwardly extending plunger, said plunger being adapted to engage the valve seat, and adjustable means for guiding said plunger and holding said plunger and dial indicator in predetermined angular position to engage a valve seat whereby the dial indicator will indicate the irregularities of said valve seat as the gauge body is rotated on said pilot.

6. In a valve seat gauge the combination of a pilot stem adapted to be fixedly secured in a valve stem guide with a gauge body rotatably and slidably mounted on said pilot stem, means for preventing downward sliding movement of said body on said stem, a dial indicator pivotally mounted on said gauge body and having a downwardly extending plunger, said plunger being adapted to engage the valve seat, adjustable means for guiding said plunger and holding said plunger and dial indicator in predetermined angular position to engage a valve seat whereby the dial indicator will indicate the irregularities of said valve seat as the gauge body is rotated on said pilot, said adjustable means comprising a stud carried by said gauge body, a clamping member carried by the stud, a laterally projecting arm, and a plunger guide pivotally mounted on said laterally projecting arm.

7. In a valve seat gauge the combination of a pilot stem adapted to be fixedly secured in a valve stem guide with a gauge body rotatably and slidably mounted on said pilot stem, a dial indicator pivotally mounted on said gauge body and having a downwardly extending plunger, said plunger being adapted to engage the valve seat, and adjustable means for guiding said plunger and holding said plunger and dial indicator in predetermined angular position to engage a valve seat whereby the dial indicator will indicate the irregularities of said valve seat as the gauge body is rotated on said pilot, said gauge body having a bore extending through the same for rotatably mounting said body on said pilot stem, and a stop member slidably and adjustably mounted in said bore for engaging the top of the pilot member.

8. In a valve seat gauge, the combination of a pilot stem adapted to be fixedly secured in a valve stem guide with a gauge body slidably and rotatably mounted on said pilot stem, said gauge body having a bore engaging the upper part of said pilot stem, an adjustable stop mounted in said bore to engage the upper end of said pilot stem, a dial indicator having a plunger mounted in the upper end of said gauge body, an extension actuated by said plunger and slidably mounted in a bore in said gauge body, and a laterally projecting wiping arm angularly and longitudinally adjustable upon said extension for wiping across the surface of a valve seat and actuating said dial indicator when said gauge body is rotated on said pilot stem.

9. In a valve seat gauge, the combination of a pilot stem adapted to be fixedly secured in a valve stem guide with a dial indicator rotatably supported upon said pilot stem, said dial indicator having a feeler and said feeler being adapted to be brought into direct engagement with the valve seat at a predetermined radius from the valve stem guide axis and adapted to traverse the valve seat upon rotation of said indicator on said stem whereby irregularities in the valve seat are indicated by the dial indicator.

10. In a valve seat gauge, the combination of a pilot stem adapted to be fixedly secured in a valve stem guide with a dial indicator rotatably supported upon said pilot stem, said dial indicator having a feeler and said feeler being adapted to be brought into direct engagement with the valve seat at a predetermined radius from the valve stem guide axis and adapted to traverse the valve seat upon rotation of said indicator on said stem whereby irregularities in the valve seat are indicated by the dial indicator, and means for supporting the dial indicator and feeler at an angle to the axis of the pilot with the end of the feeler engaging the end of the valve seat surface whereby the gauge may be used for valves of different diameters.

FRANS O. ALBERTSON.
AXEL MADSEN.